United States Patent [19]

Sidler

[11] Patent Number: 5,549,278
[45] Date of Patent: Aug. 27, 1996

[54] PARALLEL-SLIDE GATE VALVE

[75] Inventor: Hans-Jörg Sidler, Eschenbach, Switzerland

[73] Assignee: Sistag, Eschenbach, Switzerland

[21] Appl. No.: 352,973

[22] Filed: Dec. 9, 1994

Related U.S. Application Data

[63] Continuation of Ser. No. 96,639, Jul. 22, 1993, abandoned.

[30] Foreign Application Priority Data

Aug. 11, 1992 [CH] Switzerland .............................. 251392

[51] Int. Cl.⁶ ........................................................ F16K 3/00
[52] U.S. Cl. .......................... 251/328; 251/329; 251/357
[58] Field of Search .................................... 251/328, 329, 251/357

[56] References Cited

U.S. PATENT DOCUMENTS

| | | | |
|---|---|---|---|
| 227,943 | 5/1880 | Wood ..................................... | 251/329 |
| 2,194,262 | 3/1940 | Allen et al. ............................. | 251/328 |
| 3,369,791 | 2/1968 | Snodgrass et al. ................. | 251/307 X |
| 4,051,863 | 10/1977 | Still ..................................... | 251/329 X |
| 4,112,969 | 9/1978 | Still . | |
| 4,201,365 | 5/1980 | Paptzun et al. . | |
| 4,206,905 | 6/1980 | Dobler ................................ | 251/329 X |
| 4,392,510 | 7/1983 | Heckmann . | |
| 4,771,805 | 9/1988 | Maa ..................................... | 251/328 X |
| 4,881,719 | 11/1989 | Bowman ................................. | 251/328 |

FOREIGN PATENT DOCUMENTS

| | | |
|---|---|---|
| 0034745 | 9/1981 | European Pat. Off. . |
| 1071583 | 6/1967 | United Kingdom . |

*Primary Examiner*—John C. Fox
*Attorney, Agent, or Firm*—Martin A. Farber

[57] ABSTRACT

A parallel-slide gate valve with a sealing liner in two parts, comprises a semicircular lower housing part which can also be used as a mounting segment (30), and an upper housing part (31). The sealing liner (5) is also in two parts, wherein a transverse seal (20) which is subsequently compressible in operation is insertable in the liner stem (6). The assembly and dismantling of the parallel-slide gate valve can thus be effected in the direction of movement of the slide gate, and considerably ease the installation in relation to liner replacement. The mounting segment (30) can remain bolted to the pipe flanges when replacing the sealing liner (5), to align the pipe ends. The assembly is simplified in every respect, and all operating functions are optimally ensured.

1 Claim, 4 Drawing Sheets

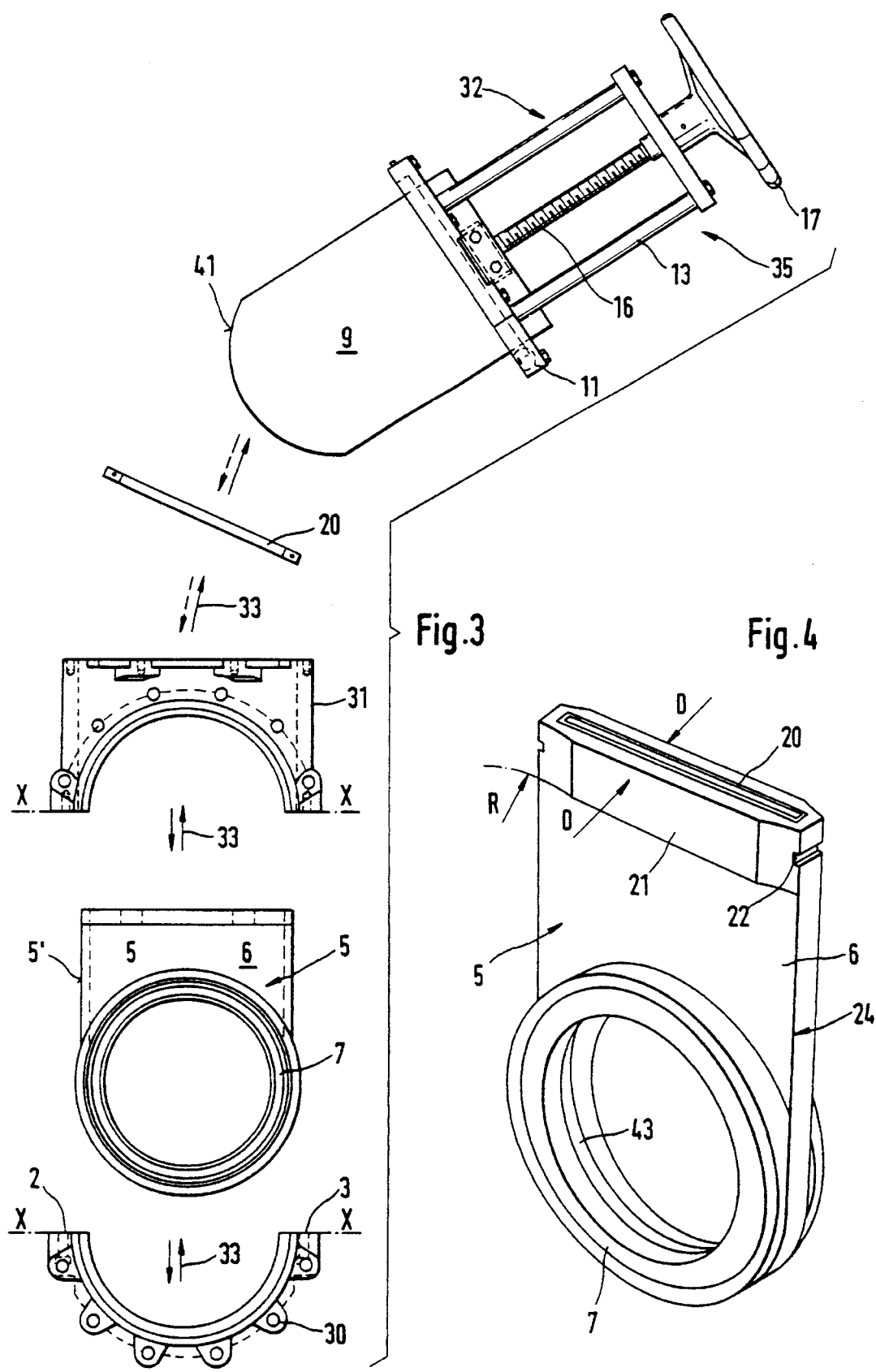

PARALLEL-SLIDE GATE VALVE

RELATED APPLICATION

This application is a continuation of my application Ser. No. 08/096,639 filed: Jul. 22, 1993, now abandoned.

The invention relates to a parallel-slide gate valve for installation between the flanges of two pipeline ends.

FIELD AND BACKGROUND OF THE INVENTION

Parallel-slide gate valves essentially consist of a slide gate housing which can be bolted between the pipe end flanges and a plane parallel slide gate plate which can be adjusted to an open, a closed or an intermediate position transverse to the pipeline axis. The slide gate adjustment is effected parallel to the main span of the slide gate housing via a threaded spindle or piston rod, be it manually, by a motor, or the like. In the installed state no leaks must occur at the slide gate, either in the region of the flanges and the plate leadthrough or in the slide gate passage, which is why seals are provided for both directions.

Slide gates are subject to corrosion and wear. The sealing parts and wear parts of the slide gate have to be renewed occasionally if necessary. Further requirements in addition to perfect operation are that the slide gate is cost-effective and simple in its construction, and that the seals and/or the wear parts can be replaced rapidly in an uncomplicated manner.

A large number of different solutions has already been produced in order to comply with all these requirements. Thus it is proposed according to US Pat. No. 4,112,969 that the slide gate housing is composed of two half faces which each incorporate a flange, a yoke for guiding the slide gate plate, and also the slide gate plate and a one-piece liner. The liner forms a sealing stem for the slide gate plate and a flange sealing ring. The sealing liner can be exposed by separating the two half faces and can then be replaced by a new liner, for example. In the region of the flange sealing ring, the half faces surround the sealing liner consisting of plastic in the manner of a ring, wherein the corresponding half faces can simply be slid over the sealing ring. The one-piece sealing liner according to U.S. Pat. No. 4,112,969 has the crucial disadvantage that hardly any sealing function is provided in the slide gate passage due to lack of axial support. Moreover, the liner stem is constructed directly as a sealing element without a separate seal, and is therefore no longer adjustable after installation.

However, parallel-slide gate valves not only have to close in a completely sealed manner, but also have to withstand enormous static and dynamic pressure loadings in very many application situations. U.S. Pat. No. 4,201,365 therefore proposes a somewhat contrasting route. A similarly constructed liner is proposed, with a flange sealing ring and a liner stem. However, the liner stem is provided with a separate slide gate seal. In particular, however, the flange sealing ring is reinforced with two embedded metal supporting rings in order to be able to withstand the corresponding contact load on the slide gate plate at high pressures. The relatively complicated shape of the liner which results from this impedes the simple construction of the slide gate housing in two parts, so that insertion of the liner here, if possible at all, is a very expensive operation; it requires either an extreme resilience for the material of the liner to be extremely resilient or vulcanising-on of the liner, however, so that the latter is no longer replaceable.

The task now set for the invention was to avoid the disadvantages of the known solutions as far as possible. However, ease of installation should be ensured, particularly of the liner also, as well as a complete sealing function.

SUMMARY OF THE INVENTION

The solution according to the invention is characterised in that the parallel-slide gate valve is composed of a two-part slide gate housing in such a way that assembly and dismantling can be effected in the direction of movement of the slide gate.

In a quite particularly advantageous embodiment it is proposed that the latter has a sealing liner, consisting of liner stem and liner flange portion, which can be installed in and removed from a slide gate housing in the direction of movement of the slide gate. It has been recognised that the known solutions too often remain restricted to the solution of only a part of the actual problem, with overemphasis on a single main task. It has surprisingly been shown that the new invention solves all the problems in a manner which was hitherto not held to be possible, particularly since assembly and dismantling are effected in the direction of movement of the slide gate, which affects both the form of the liner and that of the housing.

The parallel-slide gate valve preferably has a transverse seal (20) which surrounds the slide gate plate (9) in the region of the liner stem, though which the slide gate plate (9) is slid. The transverse seal (20) can be installed in and removed from the sealing liner (5), wherein the plate seal transverse seal (20) is most preferably constructed as a hollow section pressure seal and preferably has a sealant which can be placed under an adjustable pressure inside the hollow section. The seal (20) is not placed under pressure until after the slide gate plate (9) and the transverse seal (20) have been installed. Conversely, the seal (20) is first removed when the slide gate plate (9) and the liner (5) are to be removed, so that the installation operation can be carried out without the application of unnecessary force. According to another embodimental concept, the sealing liner consists of two parts, of the liner and the inserted transverse seal. The sealing liner is made of a flexurally resilient plastic, preferably urethane, and has a supporting collar in the stem region at the transverse seal. For anchorage, even with very great forces on the slide gate, the sealing liner has a supporting collar which is constructed protruding, with the exception of an outer section. An inwardly-directed supporting shoulder is preferably provided on each of the two narrow faces of the liner stem to receive a supporting wedge. After the removal of the slide gate plate and the transverse seal and the withdrawal of the supporting wedges, the liner can be withdrawn from the slide gate housing by deforming the liner stem.

A third, surprisingly positive effect is achieved if the slide gate housing is also constructed in two parts, wherein two housing halves in the form of half shells are formed, which can be separated and joined in the direction of movement of the slide gate. This in turn provides several advantages at the same time, particulary together with other features of the invention.

In pipeline construction, it is known that distortions occur, either during assembly or later due to environmental effects. If a parallel-slide gate valve is now completely removed from an existing pipeline, the ends of the pipeline which are detached from the slide gate flanges may be displaced significantly in relation to the common pipe axis. This may give rise to considerable difficulties on re-installation, since the pipe ends often have to be re-aligned with considerable forces so that the bolts pass though the holes. This problem can be eliminated with the form of the lower housing part as a mounting segment.

The invention also relates to the use of a parallel-slide gate valve consisting of a two-part slide gate housing, and is characterised in that it is divisible in the direction of movement of the slide gate in such a way that a mounting segment can be installed in the pipeline or the parallel-slide gate valve may be removed without the mounting segment, as an installation aid for aligning the pipe ends.

BRIEF DESCRIPTION OF THE DRAWINGS

In the following the invention is now described with additional details by way of an embodiment. There are shown:

FIG. 3 is the main elements of the parallel-slide gate valve in movement on removal or installation, in the so-called exploded representation; and FIG. 4 shown the liner with the installed plate seal;

DETAILED DESCRIPTION OF THE PREFERRED EMBODIMENTS

Figure 1:
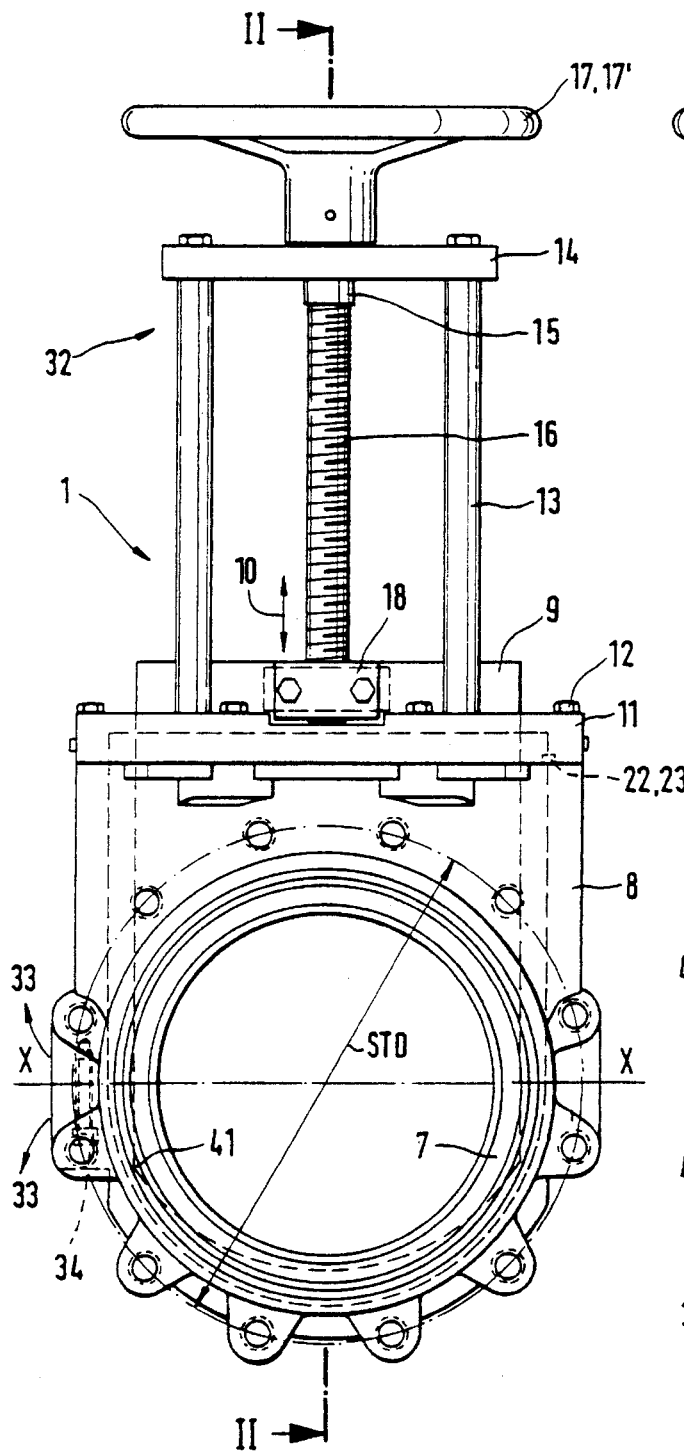
FIG. 1 in a parallel-slide gate valve in the assembled, closed state.

In the following, reference is now made to FIGS. 1 and 2. A parallel-slide gate valve 1 is mounted fixed between the flanges 2 of two pipeline ends 3 by means of a bolted connection 4, wherein a corresponding number of bolts is disposed on a bolting reference circle STD. A sealing liner 5, which consists of a liner stem 6 and a liner flange portion 7, is installed in a slide gate housing 8, in which a slide gate plate 9 can be brought into various positions of closure by a parallel movement, as indicated by the arrow 10. A seal holder 11, which is attached to the slide gate housing 8 by means of screws 12, is located in the upper part of the slide gate housing 8. Four pillars 13 are fixed to the seal holder 11, and are attached to a mounting plate 14 which has a bearing 15 for a threaded spindle 16. The threaded spindle or piston rod 16 is set in motion by an operating mechanism 17, for example by a handwheel 17' or by other operating elements, so that a driver cam 18 constructed with an internal thread, which is disposed rotationally fixed on the slide gate plate 9, travels in the manner of a feed carriage together with the slide gate plate on the threaded spindle and brings the slide gate plate 9 into the desired position. The seal holder 11, together with the four pillars 13, forms the operating mechanism 17 consisting of a drive element and a threaded spindle or piston rod 16, and the slide gate plate 9, forms an operating assembly 35 (FIG. 3). A transverse plate seal 20 for the slide gate plate 9, which seal can be placed under pressure, is disposed in the region of the liner stem 6. The sealing liner 5 is constructed from two parts, from a liner 5' and the transverse seal 20, wherein the liner 5' has a supporting collar 21 for taking up the frictional forces on the adjustment of the slide gate plate 9. The supporting collar 21 also houses the transverse seal 20. In addition, a supporting shoulder 22 is provided on the side of the supporting collar 21 to receive a supporting wedge 23; this is disposed on each narrow face 24, as may also be identified in FIG. 4. The right-half of the supporting wedge 23 is clamped between the housing 8 and the packing holder 11, upon a tightening of the screw 12. The left-hand half of the supporting wedge 23 engages the support shoulder (groove) 22 for positioning the sealing liner 5. The supporting collar 21 is constructed tapering off towards the narrow face, corresponding to a radius R for example (FIG. 4), so that the part of the sealing liner 5 which is broadened by the supporting collar 21 can be compressed to the thickness of the liner stem 6. This is possible manually when using a visco-elastic material such as urethane, for example.

As clearly shown in the exploded illustration of FIG. 3, the slide gate housing is divided into two halves along an axis x-x, into a lower housing part 30 and an upper housing part 31, which each surround the liner flange portion 7 in the form of a semicircle. To remove the sealing liner 5 the seal holder 11 is removed after first removing the complete adjusting mechanism 32 in the direction of the arrow 33. The transverse seal 20 is removed and the supporting wedges 23 are taken out. The transverse seal 20 is also withdrawn in the direction of the arrow. After removing the bolts 34 the upper housing part 31 can be lifted off together with the liner 5' in the direction of the arrow 33 and the liner 5' can be withdrawn from the upper housing part 31 by compressing it as shown by the arrows D—D (FIG. 4), and can be replaced by a new sealing liner if necessary.

Figure 2:
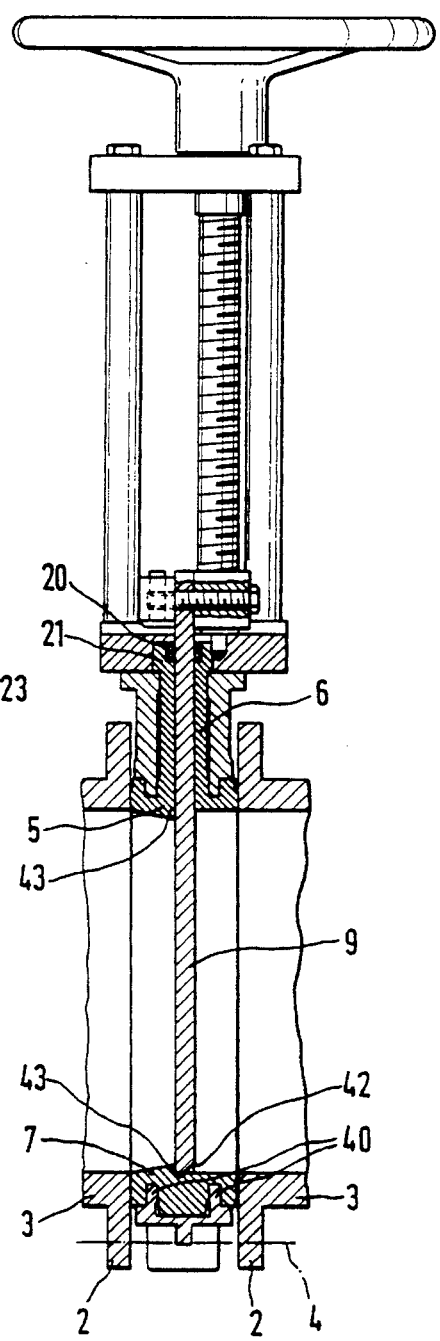
FIG. 2 in a section II—II from FIG. 1.
Figure 5:
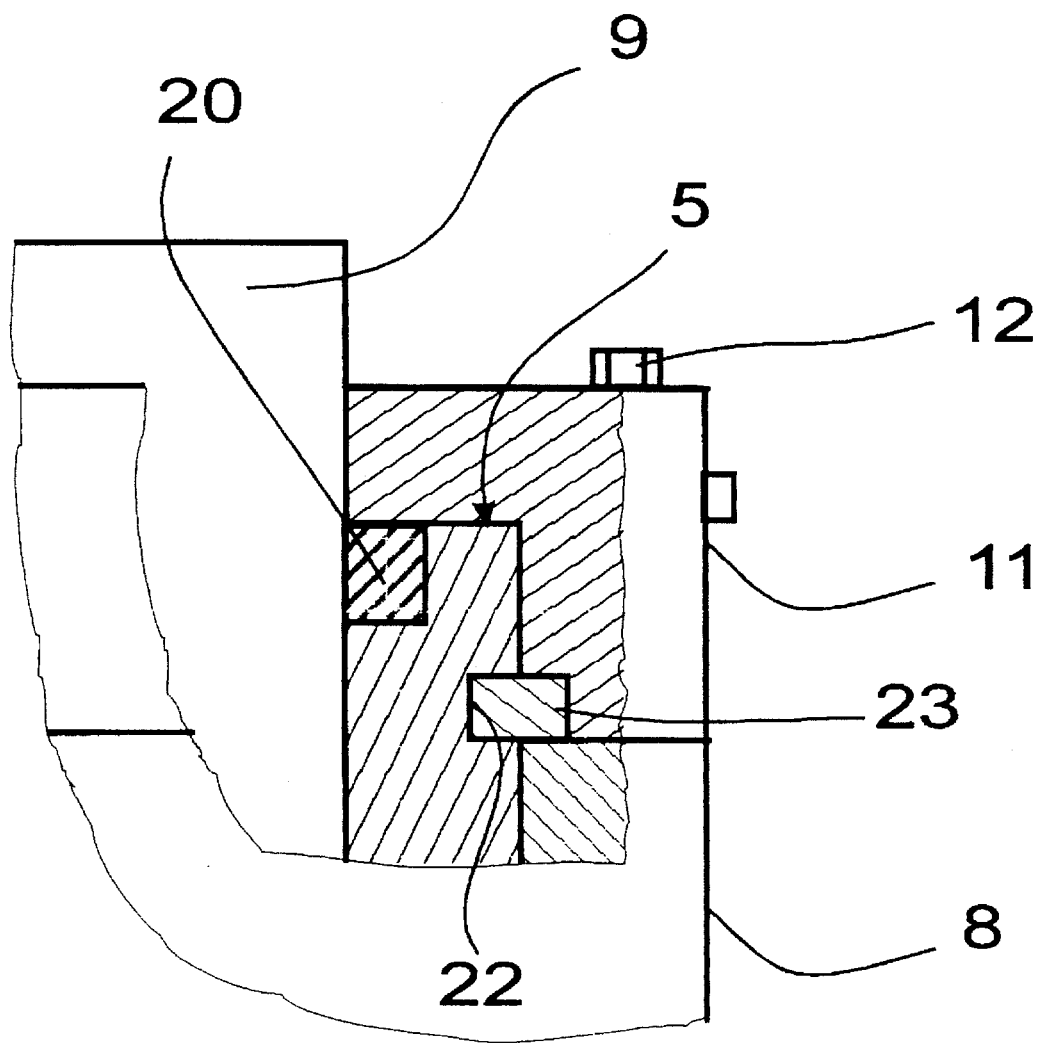
FIG. 5 an enlarged fragmentary view, partially sectioned, of the apparatus as viewed in FIG. 1.
Figure 6:
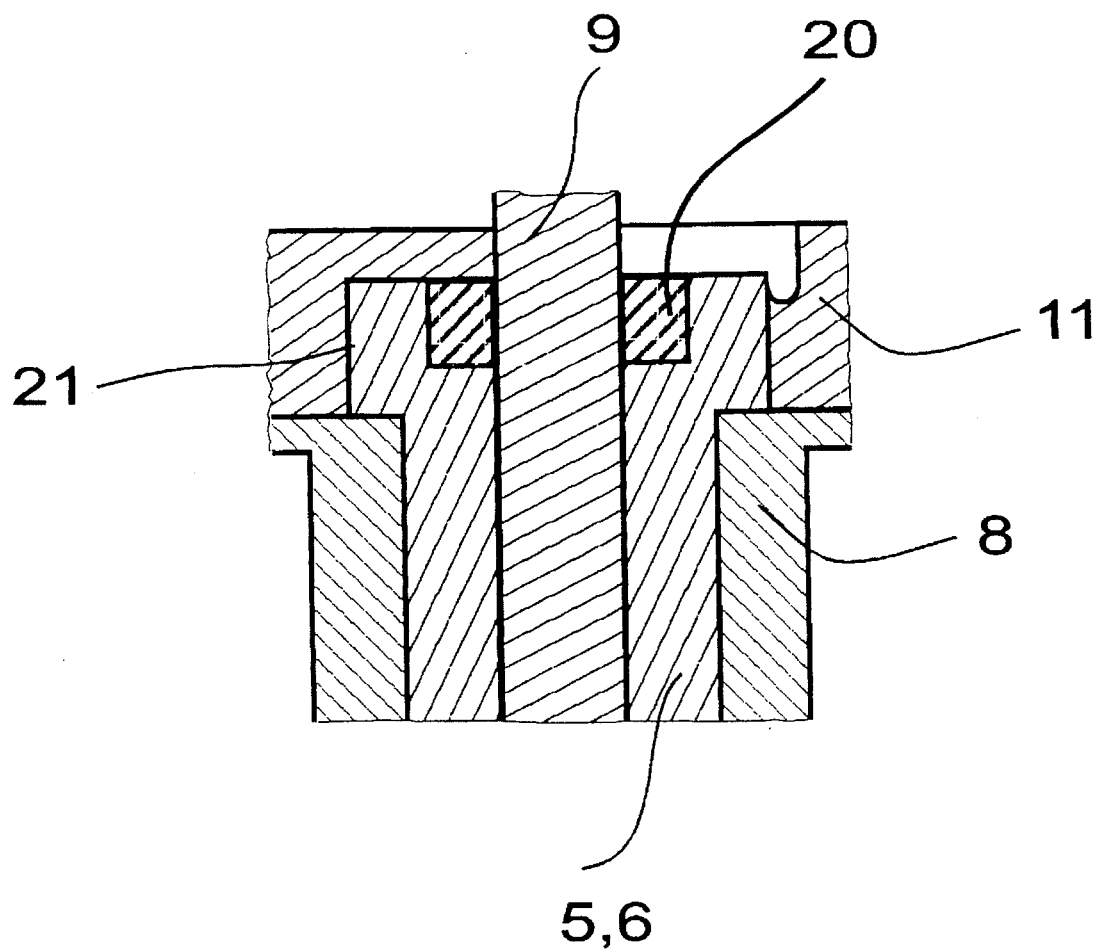
FIG. 6 an enlarged fragmentary view, in section, of the apparatus as viewed in FIG. 2.

It may also be seen from FIG. 2 that two supporting rings 40, which are integrated in the slide gate housing, engage in the liner flange portion 7 and support the latter so that it can withstand the pressure loadings from the slide gate plate. The two-part construction along the axis x-x has a particularly advantageous effect here, since each of the housing halves is inserted in the circular groove of the liner flange portion 7, which has the opposite concavity or convexity in each case, without additional precautions by means of a parallel movement. The slide gate plate 9 preferably has a "segment-like" slide gate plate radius 41 with a bevelled edge 42; this effects a certain self-cleaning action for the guide grooves in the sealing liner 5.

So that an even greater reliability can be ensured for the tightness of the seal in the slide gate passage, an additional circular sealing groove or sealing protrusion 43 is preferably provided on the liner inner section of the sealing liner 5 where the slide gate plate 9 moves (FIG. 4).

I claim:

1. Parallel-slide gate valve for installation between end flanges of two pipelines disposed along a common axis, comprising a slide gate moveable in a vertical plane normal to said common axis;

a two-part slide gate housing having two housing sections wherein each section is a half housing in the form of a half-shell terminating along an interfacing plane perpendicular to said vertical plane and having opposed side surfaces parallel to said vertical plane, the slide gate housing being assembled by a joining of the housing sections along said interfacing plane;

upper and lower connecting means on the side surfaces of respectively an upper one and a lower one of said half housings operative independently for securing said end flanges to said upper and said lower half housings, thereby providing that assembly and dismantling of the gate valve can be effected in the direction of movement of the slide gate;

a sealing liner disposed within the slide gate housing and having a liner stem portion and a liner flange portion configured to permit installation and removal of the sealing liner from the slide gate housing in the direction of movement of the slide gate;

a transverse plate seal surrounding a plate of the slide gate in a region of the liner stem portion and through which the slide gate plate can slide;

wherein the transverse plate seal is installed upon the sealing liner;

the sealing liner comprises a flexurally resilient plastic, and has a supporting collar in a stem region at the transverse plate seal, thereby to permit insertion and withdrawal of the sealing liner from the slide gate housing by deformation of the liner stem portion;

the slide gate housing has a supporting wedge; and the supporting collar is constructed compressibly and protuberantly on a sidewall of the liner stem portion, and has inwardly-directed supporting shoulders over respective narrow faces of the liner stem portion for receiving the supporting wedge.

* * * * *